(12) United States Patent
Zheng et al.

(10) Patent No.: US 12,435,896 B2
(45) Date of Patent: Oct. 7, 2025

(54) POWER LINE COMMUNICATION-BASED PAIRING METHOD AND DEVICE FOR AIR CONDITIONER, AND STORAGE MEDIUM

(71) Applicants: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

(72) Inventors: Chengli Zheng, Guangdong (CN); Wujun Zhang, Guangdong (CN); Daihui Cao, Guangdong (CN); Junlong Zhang, Guangdong (CN); Ding Zhou, Guangdong (CN)

(73) Assignees: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 90 days.

(21) Appl. No.: 18/384,503

(22) Filed: Oct. 27, 2023

(65) Prior Publication Data
US 2024/0053041 A1    Feb. 15, 2024

Related U.S. Application Data

(63) Continuation of application No. PCT/CN2021/118989, filed on Sep. 17, 2021.

(30) Foreign Application Priority Data

Apr. 30, 2021    (CN) .......................... 202110483060.3

(51) Int. Cl.
*F24F 11/56* (2018.01)
*H04B 3/54* (2006.01)

(52) U.S. Cl.
CPC .............. *F24F 11/56* (2018.01); *H04B 3/544* (2013.01)

(58) Field of Classification Search
CPC ........... F24F 11/56; F24F 11/62; H04B 3/544; H04B 3/54
See application file for complete search history.

(56) References Cited

U.S. PATENT DOCUMENTS

2019/0309971 A1* 10/2019 Burns .............. G06K 19/06037
2019/0309977 A1* 10/2019 Burns ................... F24F 1/0003
(Continued)

FOREIGN PATENT DOCUMENTS

| CN | 103954011 A | 7/2014 |
| CN | 104776562 A | 7/2015 |

(Continued)

OTHER PUBLICATIONS

International Search Report and Written Opinion dated Dec. 27, 2021 received in International Application No. PCT/CN2021/118989.

(Continued)

*Primary Examiner* — Khanh C Tran
(74) *Attorney, Agent, or Firm* — Scully, Scott, Murphy & Presser, P.C.

(57) ABSTRACT

A power line communication-based pairing method and device for an air conditioner, and a storage medium are provided. Based on a pairing request instruction, A CCO module on an indoor side selects an STA module to be paired, in a power line network, for use as a pairing object. The CCO module sends pairing request information to the power line network. The STA module receives the pairing (Continued)

request information. If the STA module determines that identification information thereof exists in the pairing request information, the STA module establishes a pairing relationship with the CCO module. The STA module sends pairing feedback information to the power line network. The CCO module receives the pairing feedback information. If the CCO module determines that the identification information thereof exists in the pairing feedback information, the CCO module determines that the pairing is successful and establishes a pairing relationship with the STA module.

12 Claims, 4 Drawing Sheets

(56) References Cited

U.S. PATENT DOCUMENTS

| | | | |
|---|---|---|---|
| 2020/0232672 A1* | 7/2020 | Cha | G08C 17/02 |
| 2021/0140669 A1* | 5/2021 | Wang | F24F 11/56 |
| 2022/0252292 A1* | 8/2022 | Vie | F24F 11/58 |

FOREIGN PATENT DOCUMENTS

| | | |
|---|---|---|
| CN | 103875188 B | 1/2016 |
| CN | 105953370 A | 9/2016 |
| CN | 106210170 A | 12/2016 |
| CN | 106533501 A | 3/2017 |
| CN | 108266861 A | 7/2018 |
| CN | 108386965 A | 8/2018 |
| CN | 108386968 A | 8/2018 |
| CN | 108541055 A | 9/2018 |
| CN | 108592302 A | 9/2018 |
| CN | 108800455 A | 11/2018 |
| CN | 110430293 A | 11/2019 |
| CN | 112332889 A | 2/2021 |
| CN | 113203190 A | 8/2021 |
| EP | 2131506 A1 | 12/2009 |
| JP | 2005127579 A | 5/2005 |

OTHER PUBLICATIONS

First Office Action dated Feb. 18, 2022 received in Chinese Patent Application No. CN 202110483060.3.
Extended European search report dated Sep. 17, 2024 received in European Patent Application No. 21938841.0.

* cited by examiner

POWER LINE COMMUNICATION-BASED PAIRING METHOD AND DEVICE FOR AIR CONDITIONER, AND STORAGE MEDIUM

CROSS-REFERENCE TO RELATED APPLICATIONS

This application is a continuation application of PCT International Patent Application No. PCT/CN2021/118989, filed on Sep. 17, 2021, which claims priority to and benefits of Chinese Patent application No. 202110483060.3 filed on Apr. 30, 2021, the entire contents of each of which are hereby incorporated by reference for all purposes. No new matter has been introduced.

TECHNICAL FIELD

The disclosure relates to the field of air conditioners, and in particular to a Power Line Communication (PLC)-based pairing method and device for an air conditioner, and a storage medium.

BACKGROUND

Power Line Communication (or Carrier) (abbreviated as "PLC") is a technology which modulates an analog or digital signal through a carrier and then couples the modulated signal to a power line, to transmit the modulated signal. A biggest feature thereof is that it is unnecessary to rebuild a network, data transmission may be done as long as there is a power line.

In the related art, the PLC technology is usually applied to scenarios such as smart meter reading, smart home, smart buildings, etc. In the field of air conditioners, due to existence of an indoor unit and an outdoor unit, communication and connection between the indoor unit and the outdoor unit are usually achieved by using a communication line. For example, in case of communication and connection between an outdoor unit and indoor units in a multi-unit-connected air conditioner, connection, control and communication are usually performed based on a Controller Area Network (CAN) bus or 485 bus connected and arranged from the outdoor unit to each of the indoor units, resulting in drawbacks such as complex installation, high material and labor costs, inconvenient maintenance, etc.

In order to save arrangement and maintenance costs of traditional communication lines, when the PLC technology is used to achieve communication and connection between the indoor unit and the outdoor unit of the air conditioner, a dedicated pairing device is required to achieve paired connection between the indoor unit and the outdoor unit, so as to avoid a problem that reliable communication and connection between the indoor unit and the outdoor unit of the same air conditioner cannot be achieved in a power line network used as a public network. However, related pairing methods are usually labor-intensive and have complex operations.

SUMMARY

In view of this, embodiments of the disclosure provide a PLC-based pairing method and device for an air conditioner, and a storage medium, which are intended to simply and reliably achieve pairing and connection between the indoor unit and the outdoor unit of the air conditioner.

An embodiment of the disclosure provides a PLC-based pairing method for an air conditioner. The air conditioner includes an indoor unit and an outdoor unit connected to a power line network, the indoor unit includes a Central Coordinator (CCO) module coupled and connected to the power line network, the outdoor unit includes a station (STA) module coupled and connected to the power line network. The method includes the following operations.

The CCO module selects a to-be-paired STA module in the power line network as a pairing object, based on a pairing request instruction.

The CCO module sends pairing request information to the power line network, the pairing request information includes the pairing request instruction, identifier (ID) information of the CCO module and ID information of the pairing object.

The STA module receives the pairing request information based on the power line network.

The STA module establishes a pairing relationship with the CCO module in response to determining that ID information of the STA module itself exists in the pairing request information.

The STA module sends pairing feedback information to the power line network, the pairing feedback information includes a pairing success instruction, the ID information of the CCO module and the ID information of the STA module.

The CCO module receives the pairing feedback information based on the power line network.

The CCO module determines that pairing is successful in response to determining that the ID information of the CCO module itself exists in the pairing feedback information, and establishes a pairing relationship with the STA module.

In some implementations, the method may further include the following operations.

An indoor unit controller of the indoor unit sends a test instruction to a paired outdoor unit in response to successful pairing of the CCO module, the test instruction is sequentially transmitted by the CCO module, the power line network and the STA module to an outdoor unit controller of the outdoor unit.

In some implementations, the method may further include the following operations in response to erroneous pairing of the outdoor unit and the indoor unit.

The outdoor unit receives a pairing removal instruction, and the STA module removes stored ID information based on the pairing removal instruction.

The indoor unit receives the pairing request instruction, and the CCO module restarts pairing based on the pairing request instruction.

In some implementations, the method may further include the following operations.

The CCO module determines that pairing fails in response to no confirmation on successful pairing of a current pairing request information within a set time period.

In some implementations, the method may further include the following operations.

An indoor unit controller of the indoor unit sends the pairing request instruction to the CCO module to restart pairing, in response to failed pairing of the CCO module.

An embodiment of the disclosure further provides an indoor unit of an air conditioner, the indoor unit includes a CCO module.

The CCO module is coupled and connected to a power line network, and is configured to:
  select a to-be-paired STA module in the power line network as a pairing object, based on a pairing request instruction;
  send pairing request information to the power line network, the pairing request information includes the pairing request instruction, ID information of the CCO module and ID information of the pairing object;

receive pairing feedback information from a STA module of an outdoor unit based on the power line network, the pairing feedback information includes a pairing success instruction, the ID information of the CCO module and ID information of the STA module; and determine that pairing is successful in response to determining that the ID information of the CCO module itself exists in the pairing feedback information, and establish a pairing relationship with the STA module.

In some implementations, the indoor unit may further include an indoor unit controller.

The indoor unit controller is configured to send a test instruction to a paired outdoor unit in response to successful pairing of the CCO module, the test instruction is sequentially transmitted by the CCO module, the power line network and the STA module to an outdoor unit controller of the outdoor unit.

In some implementations, the indoor unit controller may be further configured to send the pairing request instruction to the CCO module to restart pairing, in response to failed pairing of the CCO module.

An embodiment of the disclosure further provides an outdoor unit of an air conditioner, the outdoor unit includes a STA module.

The STA module is coupled and connected to a power line network, and is configured to:

receive pairing request information from a CCO module of an indoor unit based on the power line network, the pairing request information includes a pairing request instruction, ID information of the CCO module and ID information of a pairing object;

establish a pairing relationship with the CCO module in response to determining that ID information of the STA module itself exists in the pairing request information; and send pairing feedback information to the power line network, the pairing feedback information includes a pairing success instruction, the ID information of the CCO module and the ID information of the STA module.

In some implementations, the STA module may be further configured to remove stored ID information based on a pairing removal instruction.

An embodiment of the disclosure further provides an air conditioner, the air conditioner includes an indoor unit and an outdoor unit connected to a power line network, the indoor unit includes a CCO module coupled and connected to the power line network, the outdoor unit includes a STA module coupled and connected to the power line network. The outdoor unit and the indoor unit are configured to execute operations of the method according to the embodiments of the disclosure when the outdoor unit and the indoor unit run a computer program.

An embodiment of the disclosure further provides a storage medium, having stored thereon a computer program, the computer program implements operations of the method according to the embodiments of the disclosure when the computer program is executed by a processor.

According to certain embodiments of the disclosure, paired connection between the indoor unit and the outdoor unit based on the power line network may be achieved based on establishing pairing between the CCO module of the indoor unit and the STA module of the outdoor unit. The CCO module transmits pairing request information to the STA module used as a pairing object based on the power line network, and the STA module establishes a pairing relationship with the CCO module based on the pairing request information; the STA module transmits pairing feedback information to the CCO module based on the power line network, and the CCO module determines that pairing is successful based on the pairing feedback information, and establishes a pairing relationship with the STA module. Therefore, the embodiments implement establishing a pairing relationship between the CCO module on the indoor unit side and the STA module on the outdoor unit side, so that paired connection between the indoor unit and the outdoor unit of the air conditioner may be achieved based on the power line network without aid of additional pairing devices, installation and debugging according to the disclosure are simple, so that cost of pairing between the indoor unit and the outdoor unit of the air conditioner may be saved.

DETAILED DESCRIPTION

The disclosure will be further described in detail below with reference to the drawings and embodiments.

Unless defined otherwise, all technical and scientific terms used here have the same meaning as usually understood by technicians in the technical field to which the disclosure belongs. The terms used here in the description of the disclosure are only for the purpose of describing specific embodiments, and are not intended to limit the disclosure.

An embodiment of the disclosure provides a Power Line Communication (PLC)-based pairing method for an air conditioner, the air conditioner is configured to adjust temperature, humidity, or the like of the environment where the air conditioner is located. The air conditioner includes an indoor unit machine (abbreviated as an indoor unit) and an outdoor unit machine (abbreviated as an outdoor unit) connected by refrigerant pipes. The air conditioner may be an independent air conditioner of which indoor units correspond to outdoor units one-to-one.

It may be understood that the outdoor unit includes a compressor and a condenser, the indoor unit includes an evaporator and a fan, and the outdoor unit is connected to the indoor unit through refrigerant pipes, for example, the refrigerant pipe may be a copper pipe or an aluminum pipe. Taking a refrigeration process as an example, the compressor compresses a gaseous refrigerant (such as, Freon) into a liquid refrigerant with high temperature and high pressure, and then sends the liquid refrigerant to the condenser for heat dissipation, thereby forming a liquid refrigerant with medium temperature and medium pressure; the liquid refrigerant formed by the condenser enters the evaporator of the indoor unit through refrigerant pipes. Due to sudden increase of space and decrease of pressure, the liquid refrigerant is vaporized, a large amount of heat is absorbed in a process of converting from a liquid state to a gaseous state, and the evaporator may become cold at this time. When the fan of the indoor unit blows indoor air through the evaporator, the fan of the indoor unit may blow cold air out.

During operation, the outdoor unit also needs to communicate with the indoor unit. For example, the indoor unit sends a control instruction to the outdoor unit to control an operation mode of the outdoor unit (for example, start the compressor, etc.), and the outdoor unit sends its own operation status, environmental parameters, fault codes, or the like to the indoor unit. Therefore, when PLC is used to achieve communication between the indoor unit and the outdoor unit, it needs to establish a pairing relationship between the indoor unit and the outdoor unit, to meet information transmission requirements between the indoor unit and the outdoor unit.

In the embodiment of the disclosure, the indoor unit of the air conditioner includes an indoor unit controller and a Central Coordinator (CCO) module coupled and connected to a power line network; the outdoor unit includes an outdoor unit controller and a station (STA) module coupled and connected to the power line network.

Exemplarily, the indoor unit controller may be an indoor unit main control board, and the outdoor unit controller may be an outdoor unit control board.

Here, the CCO module may be used as a PLC host, and its main function is to convert communication data of the indoor unit controller and couple the converted data to the power line network, while convert data received from the power line network and send the converted data to the indoor unit controller.

Here, the STA module may be used as a PLC slave, and its main function is to convert data received from the power line network and send the converted data to the outdoor unit controller, while convert communication data fed back by the outdoor unit controller and couple the converted data to the power line network.

Exemplarily, the indoor unit controller may also be connected to a display module to output relevant indication information. The indoor unit controller may also be connected to a wireless receiving module to receive instructions sent by a wireless remote controller. The outdoor unit controller may be connected to an input module to receive instructions input by a user. For example, the user may set the outdoor unit to be in a to-be-paired state or exit the to-be-paired state.

Figure 1:
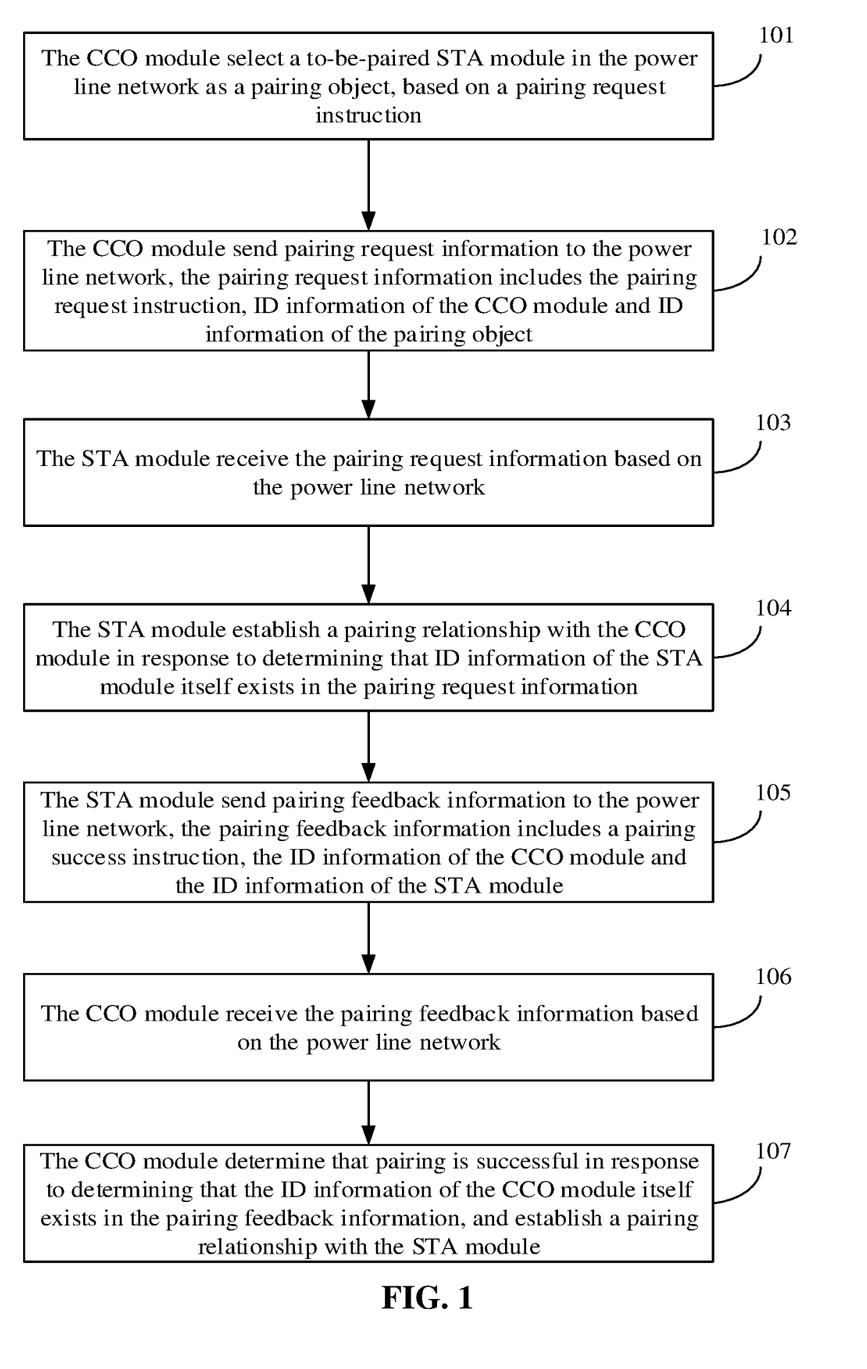
FIG. 1 is a schematic flowchart of a PLC-based pairing method for an air conditioner according to an embodiment of the disclosure.

An embodiment of the disclosure provides a PLC-based pairing method for an air conditioner. As shown in FIG. 1, the method includes the following operations 101 to 107.

At 101, the CCO module selects a to-be-paired STA module in the power line network as a pairing object, based on a pairing request instruction.

It may be understood that the indoor unit controller may receive a pairing request instruction sent by the wireless remote controller, and send the received pairing request instruction to the CCO module. Or, a dial switch may be provided on the CCO module, and the CCO module may acquire the pairing request instruction based on the dial switch; or, the indoor unit controller may receive the pairing request instruction through a human-computer interaction module (such as, key, touch screen, etc.), and send the pairing request instruction to the CCO module. A manner by which the CCO module acquires the pairing request instruction is not specifically limited in the disclosure.

Exemplarily, in case of an air conditioner which has not been paired, after the air conditioner is powered on, the user may send a pairing request instruction to the indoor unit of the air conditioner through the wireless remote controller, the indoor unit controller sends the received pairing request instruction to the CCO module, and the CCO module starts pairing based on the acquired pairing request instruction.

The CCO module may select a to-be-paired STA module in the power line network as a pairing object, based on the acquired pairing request instruction. Exemplarily, both the CCO module on the indoor unit side of the air conditioner and the STA module on the outdoor unit side have network-wide unique identifier (ID) information, for example, the ID information of the CCO module may be a Media Access Control (MAC) address of the outdoor unit or a Serial Number (SN) code of the outdoor unit which is uniquely identified network-wide; the ID information of the STA module may be an MAC address of the indoor unit or a SN code of the indoor unit which is uniquely identified network-wide. The CCO module may acquire ID information of the to-be-paired STA module based on the power line network. When there are multiple to-be-paired STA modules in a current power grid, only one of the STA modules may form a power line network with the CCO module, and other STA modules cannot be added to the formed power line network. The CCO module selects a to-be-paired STA module in a current power line network as a pairing object, and adds ID information of the selected pairing object to a pairing list such as a whitelist.

At 102, the CCO module sends pairing request information to the power line network, the pairing request information includes the pairing request instruction, ID information of the CCO module and ID information of the pairing object.

It may be understood that the pairing request information may be generated by the CCO module; or, the pairing request information may be generated by the indoor unit controller and sent to the CCO module, which are not specifically limited in the disclosure.

Exemplarily, the CCO module generates the pairing request information based on ID information of the pairing object in the whitelist, and sends the pairing request information to the power line network, so that processing logic of the indoor unit controller may be reduced. Here, the pairing request instruction may be preset coded information, which is not specifically limited in the disclosure.

At 103, the STA module receives the pairing request information based on the power line network.

The STA module on the outdoor unit side may receive the pairing request information from the CCO module, based on the power line network.

At 104, the STA module establishes a pairing relationship with the CCO module in response to determining that ID information of the STA module itself exists in the pairing request information.

It may be understood that the STA module compares the ID information of the STA module itself to ID information in the pairing request information, and determines that the pairing request information is pairing request information to be received by the STA module itself when the STA module determines that the ID information of the STA module itself exists in the pairing request information; or, discards the pairing request information when the STA module determines that the ID information of the STA module itself does not exist in the pairing request information.

As a PLC slave, the STA module may store the ID information of the CCO module in the pairing request information based on the received pairing request information, and then establish a pairing relationship with the CCO module. Exemplarily, the STA module adds the ID information of the CCO module to the whitelist, that is, establishing a pairing relationship with the CCO module refers to adding the ID information of the CCO module to the whitelist.

At 105, the STA module sends pairing feedback information to the power line network, the pairing feedback information includes a pairing success instruction, the ID information of the CCO module and the ID information of the STA module.

Here, when the STA module determines that the pairing request information is the pairing request information to be received by the STA module itself, the STA module also sends pairing feedback information to the power line network, the pairing feedback information includes a pairing success instruction, the ID information of the CCO module and the ID information of the STA module.

It may be understood that the pairing feedback information may be generated by the STA module; or, the pairing feedback information may be generated by the outdoor unit controller and sent to the STA module, which are not specifically limited in the disclosure.

Exemplarily, the STA module may generate the pairing feedback information after determining that the pairing request information is the pairing request information to be received by the STA module itself, and sends the pairing feedback information to the power line network, so that processing logic of the outdoor unit controller may be reduced. Here, the pairing success instruction may be preset coded information, which is not specifically limited in the disclosure.

At 106, the CCO module receives the pairing feedback information based on the power line network.

The CCO module on the indoor unit side may receive the pairing feedback information from the STA module, based on the power line network.

At 107, the CCO module determines that pairing is successful in response to determining that the ID information of the CCO module itself exists in the pairing feedback information, and establishes a pairing relationship with the STA module.

It may be understood that the CCO module compares the ID information of the CCO module itself to ID information in the pairing feedback information, and determines that the pairing feedback information is pairing feedback information to be received by the CCO module itself when the CCO module determines that the ID information of the CCO module itself exists in the pairing feedback information; or, discards the pairing feedback information when the CCO module determines that the ID information of the CCO module itself does not exist in the pairing feedback information, so that the pairing feedback information sent by the STA module may be transmitted to the CCO module sending the pairing request information.

The CCO module determines that pairing is successful based on the received pairing feedback information, and stores the ID information of the STA module, thereby establishing a pairing relationship with the STA module.

Exemplarily, when the ID information of the STA module is stored in the whitelist at 101, it may confirm that stored information of the whitelist is correct based on the pairing feedback information at 107, thereby establishing a pairing relationship with the STA module. When the ID information of the STA module is not stored in the whitelist at 101, ID information of a successfully paired STA module may be stored in the whitelist at 107, thereby establishing a pairing relationship with the STA module. That is, the CCO module may be stored in the whitelist based on the ID information of the selected pairing object, or may be stored in the whitelist based on the ID information of the STA module carried in the pairing feedback information, thereby establishing a pairing relationship with the STA module.

It may be understood that after the CCO module and the STA module are successfully paired, other STA modules in the power grid cannot join the power line network established by the CCO module and the STA module.

Exemplarily, the CCO module may send information indicating successful pairing to the indoor unit controller after determining that pairing is successful, and the indoor unit controller may output the information indicating successful pairing through a human-computer interaction unit, for example, through a display screen, a speaker, an indicator light or the like, so that the user may know that pairing is successful.

It may be known from the above descriptions that according to the pairing method of the embodiment of the disclosure, paired connection between the indoor unit and the outdoor unit based on the power line network may be achieved based on establishing pairing between the CCO module of the indoor unit and the STA module of the outdoor unit. The CCO module transmits pairing request information to the STA module used as a pairing object based on the power line network, and the STA module establishes a pairing relationship with the CCO module based on the pairing request information; the STA module transmits pairing feedback information to the CCO module based on the power line network, and the CCO module determines that pairing is successful based on the pairing feedback information, and establishes a pairing relationship with the STA module. Therefore, the method implements establishing a pairing relationship between the CCO module on the indoor unit side and the STA module on the outdoor unit side, so that paired connection between the indoor unit and the outdoor unit of the air conditioner may be achieved based on the power line network without aid of additional pairing devices, installation and debugging according to the method are simple, so that cost of pairing between the indoor unit and the outdoor unit of the air conditioner may be saved.

In an actual application, when there are multiple STA modules in a to-be-paired state in the current power grid, there may be errors in paired connections established between the CCO module of the indoor unit of the air conditioner and STA modules of outdoor units of other air conditioners, that is, paired STA modules in the current power line network are not actually required STA modules.

On the above basis, in some implementations, the method further includes the following operations.

An indoor unit controller of the indoor unit sends a test instruction to a paired outdoor unit in response to successful pairing of the CCO module, the test instruction is sequentially transmitted by the CCO module, the power line network and the STA module to an outdoor unit controller of the outdoor unit.

It may be understood that after the indoor unit controller receives information indicating successful pairing generated by the CCO module, the indoor unit controller may send a test instruction to an outdoor unit controller of the paired outdoor unit, the test instruction may be sequentially transmitted by the CCO module on the indoor unit side, the power line network and the STA module on the paired outdoor unit side to the outdoor unit controller of the outdoor unit. Here, since the CCO module of the paired indoor unit and the STA module of the outdoor unit have added each other's ID information to their respective local whitelist, the paired CCO module and STA module constitute a communication network based on the power line network, which may transmit the test instruction.

Exemplarily, the test instruction may be an instruction of controlling startup and operation of the outdoor unit. An operator may observe whether a compressor and/or fan of an outdoor unit which requires pairing actually is started, to determine whether the established pairing relationship is correct. When the outdoor unit which requires pairing actually is not successfully started, it may be determined that the established pairing relationship is erroneous, that is, pairing between the outdoor unit and the indoor unit is erroneous.

In some embodiments, the method further includes the following operations when the pairing between the outdoor unit and the indoor unit is erroneous.

The outdoor unit receives a pairing removal instruction, and the STA module removes stored ID information based on the pairing removal instruction.

The indoor unit receives the pairing request instruction, and the CCO module restarts pairing based on the pairing request instruction.

It may be understood that an input module such as a dial switch, a key, or the like may be provided on the outdoor unit side to input the pairing removal instruction. For example, a key or a dial switch is provided on the outdoor unit controller to input the pairing removal instruction; or, a dial switch is provided on the STA module to input the pairing removal instruction, etc. The dial switch refers to an address switch operated and controlled based on a binary coding principle of 0/1, and may also be referred to as a DIP switch, a toggling switch, an address switch, a stirring switch, a digital switch, a finger-toggling switch, etc.

Exemplarily, when it is determined that pairing is erroneous, the operator may input the pairing removal instruction based on the input module on the outdoor unit side, and the STA module may remove the stored ID information based on the pairing removal instruction, that is, the STA module may clear the whitelist and release the bound CCO module. The operator may also re-send a pairing request instruction to the indoor unit controller through the wireless remote controller, the indoor unit controller sends the pairing request instruction to the CCO module, and the CCO module restarts pairing based on the pairing request instruction.

In some embodiments, the method further includes the following operations.

The CCO module determines that pairing fails in response to no confirmation on successful pairing of a current pairing request information within a set time period.

It may be understood that after the CCO module sends the pairing request information to the power line network, the CCO module determines that pairing fails when the CCO module does not receive pairing feedback information required to be received by the CCO module itself within the set time period, and sends information indicating failed pairing to an indoor unit master controller.

In some embodiments, the method further includes the following operations.

An indoor unit controller of the indoor unit sends the pairing request instruction to the CCO module to restart pairing, in response to failed pairing of the CCO module.

It may be understood that after the indoor unit controller receives the information indicating failed pairing sent by the CCO module, the indoor unit controller may re-send the pairing request instruction to the CCO module to restart pairing.

The PLC-based pairing method for the air conditioner is exemplified below in combination with an application example.

Figure 2:
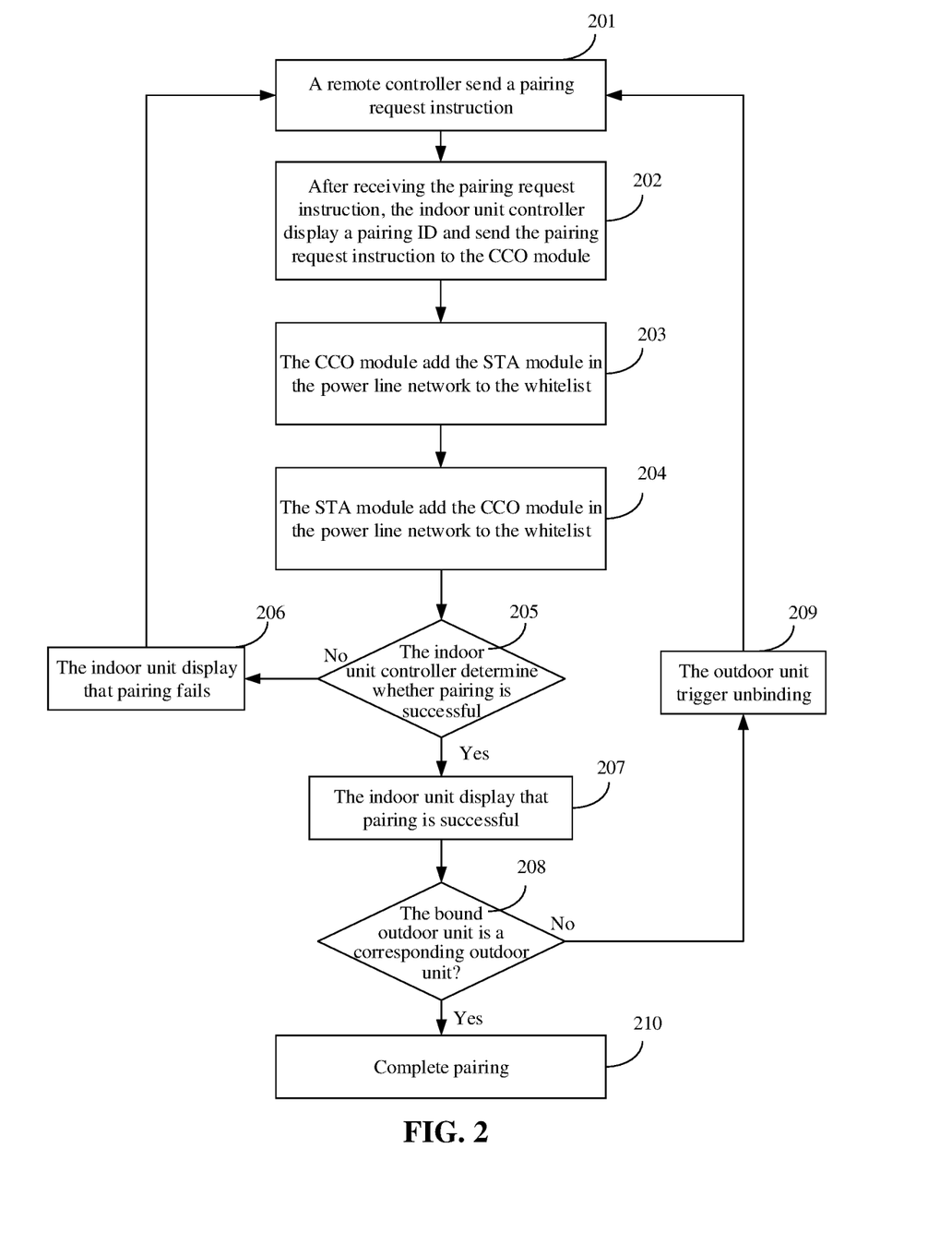
FIG. 2 is a schematic flowchart of a PLC-based pairing method for an air conditioner in an application example of the disclosure.

As shown in FIG. 2, in this application example, the pairing method includes the following operations 201 to 210.

At 201, a remote controller sends a pairing request instruction.

Exemplarily, in case of an air conditioner which has not been paired, after the air conditioner is powered on, the user may send a pairing request instruction to the indoor unit of the air conditioner through the wireless remote controller, and the indoor unit controller receives the pairing request instruction.

At 202, after receiving the pairing request instruction, the indoor unit controller displays a pairing ID and sends the pairing request instruction to the CCO module.

After receiving the pairing request instruction, the indoor unit controller may display the pairing ID on the display screen to indicate that the indoor unit is in a pairing state at present, and send the pairing request instruction to the CCO module. The pairing ID may be text information or light indication information, which is not specifically limited in the disclosure.

At 203, the CCO module adds the STA module in the power line network to the whitelist.

Exemplarily, the CCO module may select a to-be-paired STA module in the power line network as a pairing object based on the acquired pairing request instruction, and add ID information of the pairing object to the whitelist. Exemplarily, the ID information of the pairing object may be an MAC address of the outdoor unit where the STA module is located.

At 204, the STA module adds the CCO module in the power line network to the whitelist.

Exemplarily, the CCO module generates pairing request information based on ID information of the pairing object in the whitelist, and sends the pairing request information to the power line network, the pairing request information may include the pairing request instruction, ID information of the CCO module and the ID information of the pairing object. The ID information of the CCO module may be an MAC address of the indoor unit where the CCO module is located.

The STA module may receive the pairing request information from the CCO module based on the power line network. The STA module compares the ID information of the STA module itself to ID information in the pairing request information, and determines that the pairing request information is pairing request information to be received by the STA module itself when the STA module determines that the ID information of the STA module itself exists in the pairing request information; or, discards the pairing request information when the STA module determines that the ID information of the STA module itself does not exist in the pairing request information.

The STA module may store the ID information of the CCO module in the pairing request information based on the received pairing request information, that is, add the ID information of the CCO module to the whitelist.

At 205, the indoor unit controller determines whether pairing is successful, and operation 206 is executed when pairing is unsuccessful; otherwise, operation 207 is executed.

Exemplarily, when the STA module determines that the pairing request information is the pairing request information to be received by the STA module itself, the STA module also sends pairing feedback information to the power line network, the pairing feedback information includes a pairing success instruction, the ID information of the CCO module and the ID information of the STA module.

The CCO module compares the ID information of the CCO module itself to ID information in the pairing feedback information, and determines that the pairing feedback information is the pairing feedback information to be received by the CCO module itself when the CCO module determines that the ID information of the CCO module itself exists in the pairing feedback information; or, discards the pairing feedback information when the CCO module determines that the ID information of the CCO module itself does not exist in the pairing feedback information, so that the pairing feedback information sent by the STA module may be transmitted to the CCO module sending the pairing request information.

After the CCO module sends the pairing request information to the power line network, the CCO module determines that pairing fails when the CCO module does not receive pairing feedback information required to be received by the CCO module itself within the set time period, and sends information indicating failed pairing to an indoor unit master controller. When the CCO module receives pairing feedback information required to be received by the CCO module itself within the set time period, the CCO module determines that pairing is successful based on the received pairing feedback information, and sends information indicating successful pairing to the indoor unit controller.

The indoor unit controller may determine whether pairing is successful based on the information fed back by the CCO module, and operation 206 is executed when pairing is unsuccessful; otherwise, operation 207 is executed.

At 206, the indoor unit displays that pairing fails, and the process returns to 201.

The display module of the indoor unit may display information indicating failed pairing, and the process returns to 201 to restart pairing.

At 207, the indoor unit displays that pairing is successful.

The display module of the indoor unit may display information indicating successful pairing.

At 208, it is determined whether the bound outdoor unit is a corresponding outdoor unit, and operation 209 is executed when the bound outdoor unit is not a corresponding outdoor unit; otherwise, operation 210 is executed.

Exemplarily, after the indoor unit controller receives the information indicating successful pairing generated by the CCO module, the indoor unit controller may send a test instruction to an outdoor unit controller of the paired outdoor unit, the test instruction may be sequentially transmitted by the CCO module on the indoor unit side, the power line network and the STA module on the paired outdoor unit side to the outdoor unit controller of the outdoor unit.

The test instruction may be an instruction of controlling startup and operation of the outdoor unit. The operator may observe whether a compressor and/or fan of an outdoor unit which requires pairing actually is started, to determine whether the established pairing relationship is correct. When the outdoor unit which requires pairing actually is not successfully started, it may be determined that the established pairing relationship is erroneous, that is, pairing between the outdoor unit and the indoor unit is erroneous.

At 209, the outdoor unit triggers unbinding, and the process returns to 201.

When there is erroneous pairing, the operator may manually input a removal instruction on the input module on the outdoor unit side. For example, a pairing removal instruction is input based on the input module of the outdoor unit controller, and the STA module remove the stored ID information based on the pairing removal instruction, that is, the STA module clears the whitelist and releases the bound CCO module. The process returns to 201 to restart pairing.

At 210, pairing is completed, and the pairing process is exited.

When pairing between the outdoor unit and the indoor unit is correct, pairing is completed, and the pairing process is exited.

It may be known from the above descriptions that according to the pairing method of this application example, pairing may be directly made based on the CCO module and the STA module in the power line network, without aid of additional pairing devices, installation and debugging according to the method are simple, so that cost of pairing between the indoor unit and the outdoor unit of the air conditioner may be saved.

Figure 3:
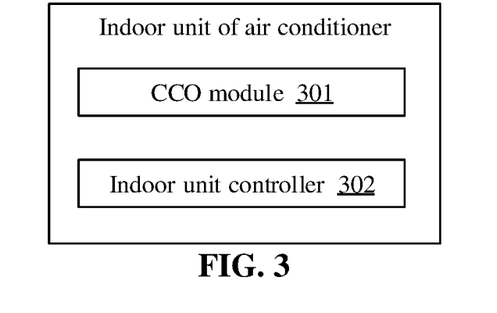
FIG. 3 is a schematic structural diagram of an indoor unit of an air conditioner according to an embodiment of the disclosure.

An embodiment of the disclosure further provides an indoor unit of an air conditioner. As shown in FIG. 3, the indoor unit includes a CCO module 301, the CCO module 301 is coupled and connected to a power line network, and is configured to:
  select a to-be-paired STA module in the power line network as a pairing object, based on a pairing request instruction;
  send pairing request information to the power line network, the pairing request information includes the pairing request instruction, ID information of the CCO module and ID information of the pairing object;
  receive pairing feedback information from a STA module of an outdoor unit based on the power line network, the pairing feedback information includes a pairing success instruction, the ID information of the CCO module and ID information of the STA module; and
  determine that pairing is successful in response to determining that the ID information of the CCO module itself exists in the pairing feedback information, and establish a pairing relationship with the STA module.

In some embodiments, the indoor unit further includes an indoor unit controller 302, the indoor unit controller 302 is connected in communication with the CCO module 301, and is configured to send a test instruction to a paired outdoor unit in response to successful pairing of the CCO module, the test instruction is sequentially transmitted by the CCO module, the power line network and the STA module to an outdoor unit controller of the outdoor unit.

In some embodiments, when pairing between the outdoor unit and the indoor unit is erroneous, the indoor unit controller 302 further receives the pairing request instruction, and the CCO module 301 is further configured to restart pairing based on the pairing request instruction.

In some embodiments, the CCO module 301 is further configured to determine that pairing fails in response to no confirmation on successful pairing of a current pairing request information within a set time period.

In some embodiments, the indoor unit controller 302 is further configured to send the pairing request instruction to the CCO module 301 to restart pairing, in response to failed pairing of the CCO module 301.

Figure 4:
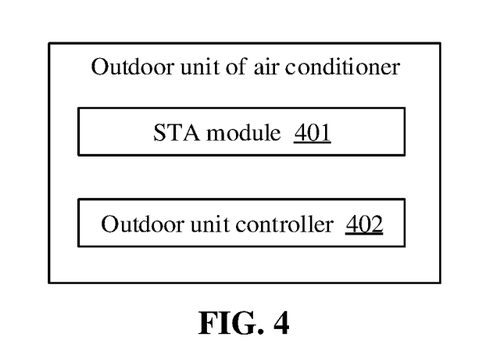
FIG. 4 is a schematic structural diagram of an outdoor unit of an air conditioner according to an embodiment of the disclosure.

An embodiment of the disclosure further provides an outdoor unit of an air conditioner. As shown in FIG. 4, the outdoor unit includes a STA module 401, the STA module 401 is coupled and connected to a power line network, and is configured to:
  receive pairing request information from a CCO module of an indoor unit based on the power line network, the pairing request information includes a pairing request instruction, ID information of the CCO module and ID information of a pairing object;

establish a pairing relationship with the CCO module in response to determining that ID information of the STA module itself exists in the pairing request information; and send pairing feedback information to the power line network, the pairing feedback information includes a pairing success instruction, the ID information of the CCO module and the ID information of the STA module.

In some implementations, the STA module 401 is further configured to remove stored ID information based on a pairing removal instruction.

Exemplarily, the outdoor unit includes an outdoor unit controller 402, an input module is provided on the outdoor unit controller 402, and the operator may input a pairing removal instruction through the input module when it is determined that pairing between the outdoor unit and the indoor unit is erroneous, and the outdoor unit controller 402 sends the pairing removal instruction to the STA module 401. The input module may be a key or a dial switch.

Figure 5:
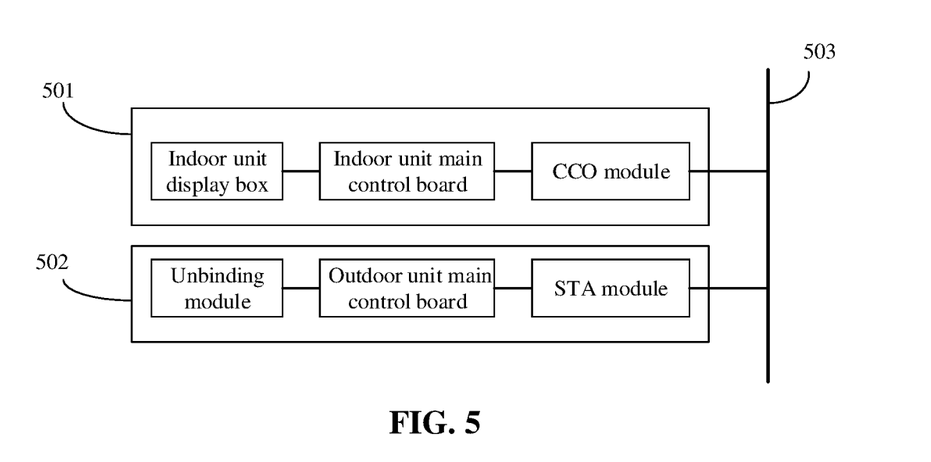
FIG. 5 is a schematic structural diagram of an air conditioner according to an embodiment of the disclosure.

An embodiment of the disclosure further provides an air conditioner. As shown in FIG. 5, the air conditioner includes an indoor unit 501 and an outdoor unit 502 connected to a power line network 503. The indoor unit 501 and the outdoor unit 502 are configured to execute operations of the method according to the foregoing embodiments of the disclosure when the outdoor unit and the indoor unit run a computer program. Details may refer to descriptions of the foregoing method embodiments, and are not elaborated here.

It should be noted that the air conditioner according to the embodiment of the disclosure is configured to adjust temperature, humidity, or the like of the environment where the air conditioner is located. The air conditioner may be a single-refrigerating air conditioner or a dual-purpose air conditioner, and may be a wall-mounted air conditioner, a vertical cabinet air conditioner, a window-mounted air conditioner, a ceiling-mounted air conditioner, or other forms of air conditioners, which are not specifically limited in the embodiment of the disclosure.

The air conditioner according to the embodiment of the disclosure may be an independent air conditioner of which indoor units correspond to outdoor units one-to-one.

Exemplarily, the indoor unit 501 includes an indoor unit main control board, a CCO module and an indoor unit display box (equivalent to a display module), the indoor unit display box and the CCO module are connected to the indoor unit main control board, and the CCO module is coupled to the power line network.

Exemplarily, the outdoor unit 502 includes an outdoor unit main control board, a STA module and an unbinding module (equivalent to an input module), the unbinding module and the STA module are connected to the outdoor unit main control board, and the STA module is connected to the power line network.

In an exemplary embodiment, an embodiment of the disclosure further provides a storage medium, i.e., a computer storage medium. Specifically, the storage medium may be a computer-readable storage medium, for example, including a memory having stored thereon a computer program, and the computer program may be executed by a processor of the air conditioner to implement operations of the method according to the embodiments of the disclosure. The computer-readable storage medium may be a Read Only Memory (ROM), a Programmable Read-Only Memory (PROM), an Erasable Programmable Read-Only Memory (EPROM), an Electrically Erasable Programmable Read-Only Memory (EEPROM), a flash memory, a magnetic surface memory, an optical disk, a Compact Disc Read-Only Memory (CD-ROM), or other memories.

It should be noted that "first", "second" or the like are intended to distinguish similar objects, and are not intended to describe a specific order or sequence.

Furthermore, the technical solutions described in the embodiments of the disclosure may be arbitrarily combined there-between without conflict.

The above descriptions are only specific implementations of the disclosure, however, the scope of protection of the disclosure is not limited thereto. Any variation or replacement easily conceived by those skilled in the art within the technical scope disclosed by the disclosure should be included in the scope of protection of the disclosure. Therefore, the scope of protection of the disclosure should be subjected to the scope of protection of claims.

The invention claimed is:

1. A Power Line Communication (PLC)-based pairing method for an air conditioner, the air conditioner comprising an indoor unit and an outdoor unit connected to a power line network, the indoor unit comprising a Central Coordinator (CCO) module coupled and connected to the power line network, the outdoor unit comprising a station (STA) module coupled and connected to the power line network, the method comprising:

selecting, by the CCO module, a to-be-paired STA module in the power line network as a pairing object based on a pairing request instruction;

sending, by the CCO module, pairing request information to the power line network, the pairing request information comprising the pairing request instruction, identifier (ID) information of the CCO module and ID information of the pairing object;

receiving, by the STA module, the pairing request information based on the power line network;

establishing, by the STA module, a pairing relationship with the CCO module in response to determining that ID information of the STA module exists in the pairing request information;

sending, by the STA module, pairing feedback information to the power line network, the pairing feedback information comprising a pairing success instruction, the ID information of the CCO module and the ID information of the STA module;

receiving, by the CCO module, the pairing feedback information based on the power line network; and determining, by the CCO module, that pairing is successful in response to determining that the ID information of the CCO module exists in the pairing feedback information, and establishing, by the CCO module, a pairing relationship with the STA module.

2. The PLC-based pairing method of claim 1, further comprising:

sending, by an indoor unit controller of the indoor unit, a test instruction to a paired outdoor unit in response to successful pairing of the CCO module, the test instruction sequentially transmitted by the CCO module, the power line network and the STA module to an outdoor unit controller of the outdoor unit.

3. The PLC-based pairing method of claim 2, further comprising in response to erroneous pairing of the outdoor unit and the indoor unit:

receiving, by the outdoor unit, a pairing removal instruction, and removing, by the STA module, stored ID information based on the pairing removal instruction; and receiving, by the indoor unit, the pairing request instruction, and restarting, by the CCO module, pairing based on the pairing request instruction.

4. The PLC-based pairing method of claim 1, further comprising:

determining, by the CCO module, that pairing fails in response to no confirmation on successful pairing of a current pairing request information within a set time period.

5. The PLC-based pairing method of claim 4, further comprising:

sending, by an indoor unit controller of the indoor unit, the pairing request instruction to the CCO module to restart pairing, in response to failed pairing of the CCO module.

6. An air conditioner comprising:

an indoor unit and an outdoor unit connected to a power line network, wherein the indoor unit comprises a Central Coordinator (CCO) module coupled and connected to the power line network, the outdoor unit comprising a station (STA) module coupled and connected to the power line network, and wherein the outdoor unit and the indoor unit are configured to execute the PLC-based pairing method of claim 1 when the outdoor unit and the indoor unit run a computer program.

7. A non-transitory computer-readable storage medium having stored thereon a computer program, the computer program implementing the PLC-based pairing method of claim 1 when the computer program is executed by a processor.

8. An indoor unit of an air conditioner, comprising:

a Central Coordinator (CCO) module, coupled and connected to a power line network, and configured to:

select a to-be-paired station (STA) module in the power line network as a pairing object based on a pairing request instruction;

send pairing request information to the power line network, the pairing request information comprising the pairing request instruction, identifier (ID) information of the CCO module and ID information of the pairing object;

receive pairing feedback information from a STA module of an outdoor unit based on the power line network, the pairing feedback information comprising a pairing success instruction, the ID information of the CCO module and ID information of the STA module; and determine that pairing is successful in response to determining that the ID information of the CCO module exists in the pairing feedback information, and establish a pairing relationship with the STA module.

9. The indoor unit of claim 8, further comprising:

an indoor unit controller, configured to send a test instruction to a paired outdoor unit in response to successful pairing of the CCO module, the test instruction sequentially transmitted by the CCO module, the power line network and the STA module to an outdoor unit controller of the outdoor unit.

10. The indoor unit of claim 9, wherein the indoor unit controller is further configured to:

send the pairing request instruction to the CCO module to restart pairing, in response to failed pairing of the CCO module.

11. An outdoor unit of an air conditioner, comprising:

a station (STA) module, coupled and connected to a power line network, and configured to:

receive pairing request information from a Central Coordinator (CCO) module of an indoor unit based on the power line network, the pairing request information comprising a pairing request instruction, identifier (ID) information of the CCO module and ID information of a pairing object;

establish a pairing relationship with the CCO module in response to determining that ID information of the STA module exists in the pairing request information; and send pairing feedback information to the power line network, the pairing feedback information comprising a pairing success instruction, the ID information of the CCO module and the ID information of the STA module.

12. The outdoor unit of claim 11, wherein the STA module is further configured to: remove stored ID information based on a pairing removal instruction.

* * * * *